United States Patent [19]

Jegousse et al.

[11] Patent Number: 4,687,378

[45] Date of Patent: Aug. 18, 1987

[54] TEMPORARILY TERMINATING LAYING OF UNDERWATER PIPE LINE

[75] Inventors: Michel Jegousse, Saint Herblain; Yves Le Hir, Nantes, both of France

[73] Assignee: Compagnie Francaise des Petroles, France

[21] Appl. No.: 250,787

[22] Filed: Apr. 3, 1981

[30] Foreign Application Priority Data

Apr. 4, 1980 [FR] France ................................. 80 07686

[51] Int. Cl.⁴ .............................................. F16L 1/04
[52] U.S. Cl. .................................... 405/171; 405/158; 405/168
[58] Field of Search ................ 405/258, 166, 168–172, 405/158, 173

[56] References Cited

U.S. PATENT DOCUMENTS

| 4,056,944 | 11/1977 | Lamy | .................................. 405/170 |
| 4,063,430 | 12/1977 | Lamy | .............................. 405/166 X |

FOREIGN PATENT DOCUMENTS 6910043  1/1971  Netherlands ........................ 405/171

Primary Examiner—Richard J. Scanlan, Jr.
Assistant Examiner—Nancy J. Stodola
Attorney, Agent, or Firm—Sughrue, Mion, Zinn, Macpeak and Seas

[57] ABSTRACT

The invention relates to the setting-down of a pipe in the sea using a setting-down line. The line is provided with sinkers at its lower end portion which tension the line and allow a reduction in the angle of general inclination of the line with the vertical and thus a reduction in the length of the line.

4 Claims, 3 Drawing Figures

TEMPORARILY TERMINATING LAYING OF UNDERWATER PIPE LINE

The present invention relates to a process for the setting-down of a pipe in the sea, especially in deep sea, and also a setting-down line which makes it possible to use this process.

The term setting-down used herein denotes the operation wherein, after a worksite for laying a pipe in the sea has been shut down for technical or meteorological reasons, the free or open end of the said pipe is closed by a watertight traction head, the latter is joined, with the aid of a suitable setting-down line, to a tensioning device of the winch type, located on the laying vessel, and this vessel is moved forward whilst paying out the setting-down line under a constant tension, until the whole of the pipe, and also the said traction head, are resting on the sea bed.

It is important that an operation of this type can be carried out rapidly and under good safety conditions, so that the pipe, set down as rapidly as possible in this way, can nevertheless be protected.

It is known that it is especially appropriate, in such cases, to transfer the tension previously exerted by suitable tensioning devices to a constant-tension winch, and to enable the laying vessel to free itself from its shackles and to move forward until the whole of the pipe has been set down on the sea bed.

The setting-down line is then marked by a buoy and can be left until the causes which justified the setting-down of the pipe have disappeared.

When an operation of this type is to be carried out at great depth, it presents increased difficulties, especially because of the fact that, due to the very depths to be reached, the length of the setting-down line, and hence its own weight, increase considerably, and this is in addition to the already large, external forces to which the said line is otherwise subjected.

In order to give an order of magnitude of the forces involved, it suffices to state that, for a setting-down operation at a depth of 2,500 m, the setting-down line can reach a length of 8,000 meters and have a weight of the order of 150 tonnes and can be subjected to forces of the order of 400 tonnes.

One object of the invention is to reduce the length of the setting-down line. To do this, the invention provides for tensioning the setting-down line by means of sinkers on the lower portion of the setting-down line, so as to reduce the angle of general inclination formed by the setting-down line with the vertical.

The setting-down line may consist of a cable which extends from the traction head to the tensioning device of the winch type, carried by the vessel, and which carries, in a lower portion adjacent to the traction head, heavy elements which are held on the cable, for example by gripping by means of clamping devices.

These heavy elements are preferably distributed over a certain length of this lower portion, rather than being concentrated at a point located next to the traction head.

According to another aspect of the invention, the setting-down line comprises a long upper portion comprising a cable and a short lower portion comprising a series of elongate heavy elements articulated on one another at their ends, the lower end of this lower portion of setting-down line being adapted to be articulated on the said free end of the pipe and the upper end of this lower portion of setting-down line being articulated on the lower end of the said upper portion of setting-down line.

The handling operations are facilitated by giving these heavy elements a similar shape to that of the pipe sections and, in particular, by giving them substantially the same length. In order to use the same passages and gripping members as with the pipe sections, provision is advantageously made for the transverse dimensions of the heavy elements not to be greater than those of the said sections.

For holding the setting-down line in position after the setting-down operation has been carried out, provision is then advantageously made for one or more pencil buoys to be immersed to a depth which can be reached by divers. These pencil buoys have the advantage of possessing a similar shape to that of the pipe sections and hence of being able to be handled in a similar manner. Their cross-section is preferably not greater than that of the pipe.

For easy recovery of the setting-down line after the causes which justified the setting-down of the pipe have disappeared, a surface line, which is of similar gauge than the setting-down line and is fitted with floats, is made fast, that is to say attached, to the pencil buoys in the final phase of the setting-down operation.

Other features of the invention will become apparent from the following description of an embodiment of the invention, given by way of example only with reference to the accompanying drawings. In the drawings.

Figure 1:
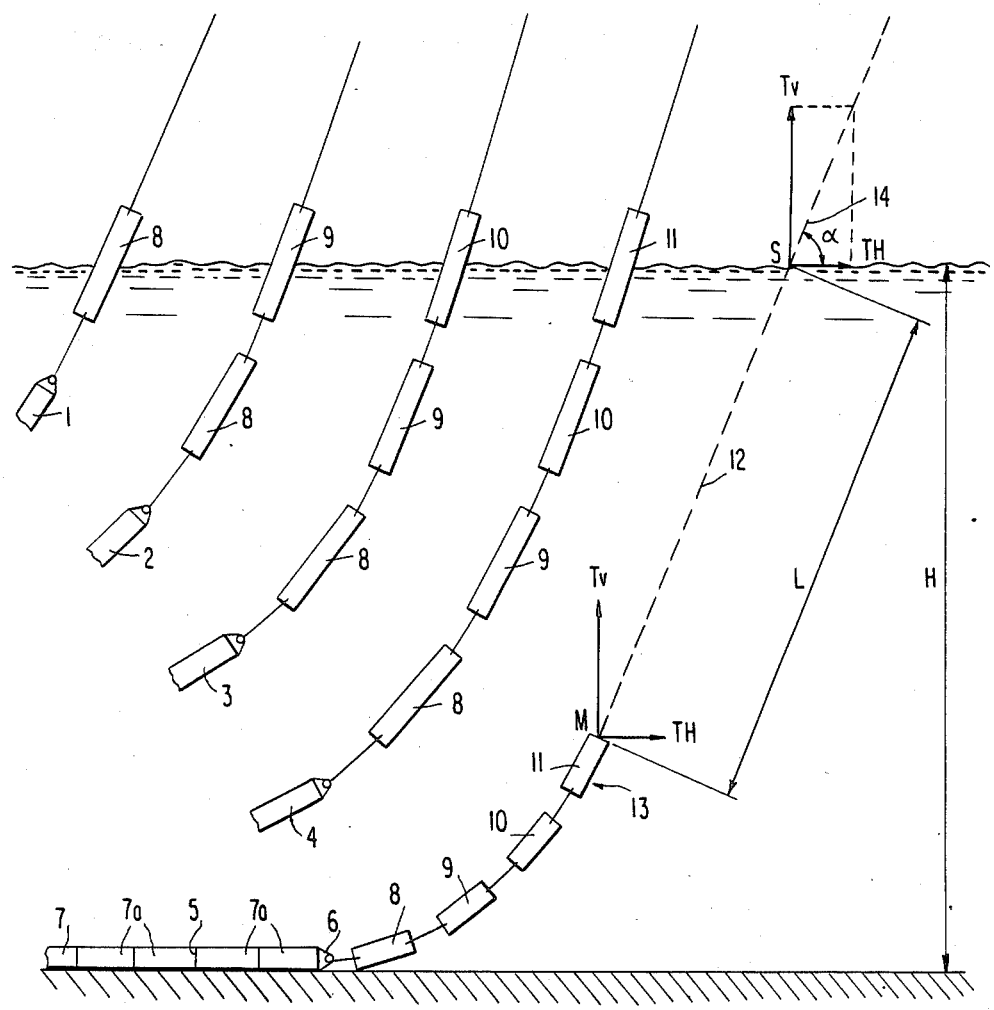
FIG. 1 shows different positions of a setting-down line attached to the end of a pipe, during a setting-down operation.

In FIG. 1, successive positions adopted by the setting-down line 13 are shown at 1, 2, 3, 4 and 5. The line comprises a traction head 6 which is fixed to the free end of a pipe 7, and elongate heavy elements 8, 9, 10 and 11, which are placed in series, at the start of the setting-down operations, between the traction head 6 and a traction cable 12. The setting-down line 13, the lower portion of which consists of the heavy elements 8, 9, 10 and 11, and the upper portion of which consists of the cable 12, is joined at its upper end 14 to a tensioning device, which is not shown, mounted on a vessel, which is also not shown.

It is known that, during a setting-down operation, it is necessary to maintain a sufficient tractive force in the horizontal direction in order to avoid bending the pipe to a radius of curvature which is less than a certain critical radius, which would seriously damage the pipe.

It is seen that, in position 5 of the setting-down line 13, and according to the inclination of the heavy element 8 and the cable 12, the pipe 7 is subjected to a horizontal tractive force which, in the absence of the heavy elements 8, 9, 10 and 11, would require a much greater angle of inclination ($90°-\alpha$) of the cable 12 with the vertical.

It has been found that the optimum ratio of the length L of the setting-down line 13 or of the upper portion of the latter, consisting of the cable 12 (it being possible for the short length of the lower portion 8, 9, 10 and 11 to be neglected in comparison with the total length), to the depth H of the sea is about 1.25. With the cable 12 being directed along the resultant of the forces which are applied thereto, if $T_V$ and $T_H$ denote the vertical and horizontal components of the tension exerted at a point on the cable which can be taken at the lower end M of the latter or at its point of emergence S, then:

$T_V = T_H \tan \alpha$ $\sin \alpha = (H/L) = (1/1.25) = 0.8$

If it is desired to maintain a horizontal tension $T_H$ of 30 tonnes, there is therefore a vertical tension $T_V$ of 40 tonnes, which is opposed by the weight of the elements 8, 9, 10 and 11, and this makes it possible to determine the dimensions and the composition of the latter in order to obtain this weight, and consequently to reduce the ratio L/H to 1.25, this giving a length L of about 3,125 meters for a depth of 2,500 meters.

It is obviously possible to have a ratio L/H of ore than 1.25 whilst gaining an appreciable advantage by using the invention.

Advantageously, the ratio of the length of the setting-down line to the depth at which the pipe is to be set down is less than 1.5, this upper limit of 1.5 being very considerably less than the lower limits attained at the present time.

The heavy elements, such as 8, 9, 10 and 11, can advantageously have a similar shape and similar external dimensions to those of the sections 7a forming the pipe 7.

At their ends, these heavy elements can then have non-watertight traction heads, such as the heads 15 and 16 (FIG. 2) at the ends of the element 9.

It is even possible to give these heavy elements the same apparent weight as that of the pipe sections by constructing them with a lesser thickness of material or from a less dense material, and this makes it possible to have a lower portion 8, 9, 10 or 11 of the setting-down line 13 which simulates an articulated extension of the pipe 7.

Figure 2:
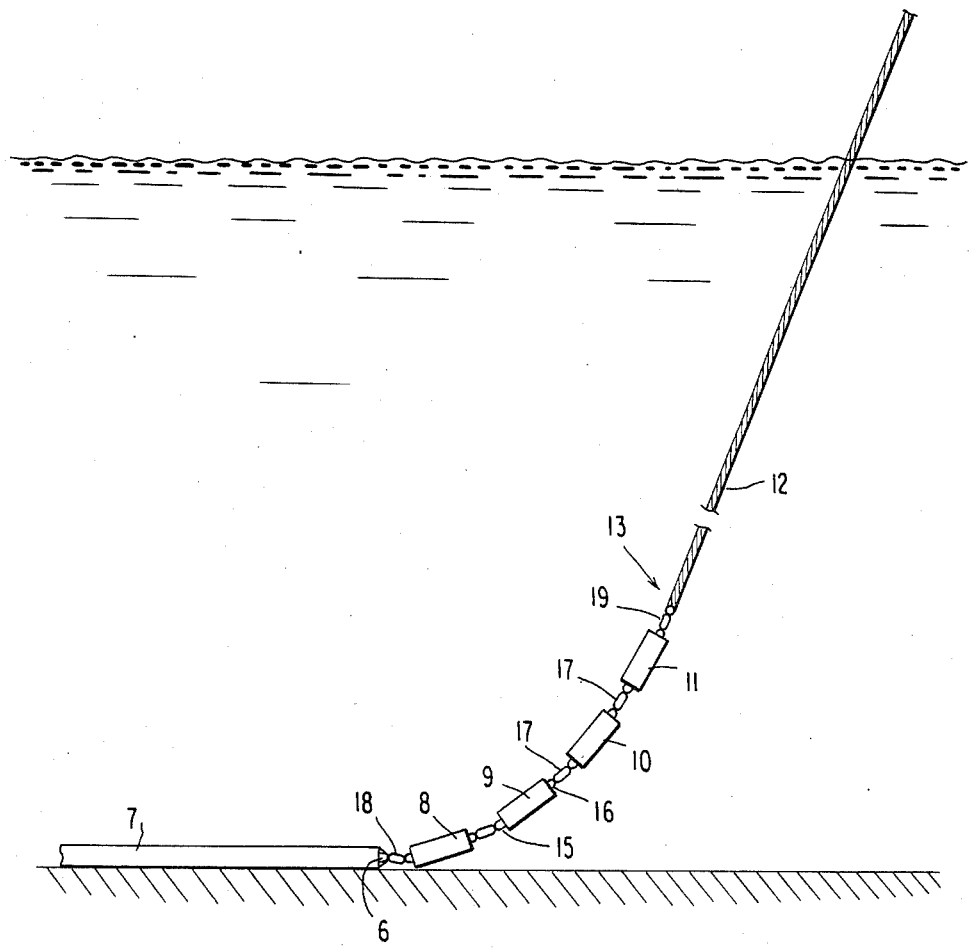
FIG. 2 shows the construction of the setting-down line in greater detail.

As shown in FIG. 2, the heavy elements 8, 9, 10 and 11 are joined to one another by chain links or chain elements, such as 17. The ends of the lower portion of the setting-down line are joined by chain elements 18 and 19 to the traction head 6 and to the lower end of the cable 12 respectively.

Advantageously, a substantially constant angle of general inclination (90°-α) of the setting-down line is maintained throughout the setting-down operation. To do this, the thrust of the vessel carrying the winch on which the cable 12 is wound is adjusted as a function of the desired angle of inclination.

At the start of the setting-down operation, the heavy elements 8, 9, 10 and 11 are introduced successively in a similar manner to that in which new pipe sections would be added, as regards gripping and lowering the elements and also keeping the pipe under tension.

Instead of being metal, the cable 12 is advantageously made of a synthetic material, such as, for example, one of the products sold commercially under the trademarks KEVLAR and TERYLENE. The respective weights of cable which are made of these latter materials and which are suitable for a setting-down operation are 14 kg and 29 kg per linear meter in air and 4 kg and 4.4 kg per meter in water.

In the given example of a setting-down line of 3,125 meters for a depth of 2,500 meters, the vertical load exerted on a buoy by a KEVLAR cable is of the order of only 11 tonnes.

A capstan may be used as the tensioning device instead of the horizontal-axis winch usually employed in such cases. The combined use of a cable made of synthetic material and a capstan makes it possible to apply very large forces, namely of the order of one thousand tonnes, to long lines. These lines can be stored on a drum, under low tension, or, if appropriate, in tanks.

After the setting-down operation has been completed, the pipe can be maintained in total safety by the laying vessel during waiting periods of the vessel, resulting from adverse weather or a technical incident, it then being unnecessary for the vessel to maintain its heading, and the vessel being stabilised against the rolling and pitching movements, because of the very fact that it remains connected to the pipe. This makes it possible, in particular, to simplify the operations and to resume the normal laying of the pipe more rapidly.

Figure 3:
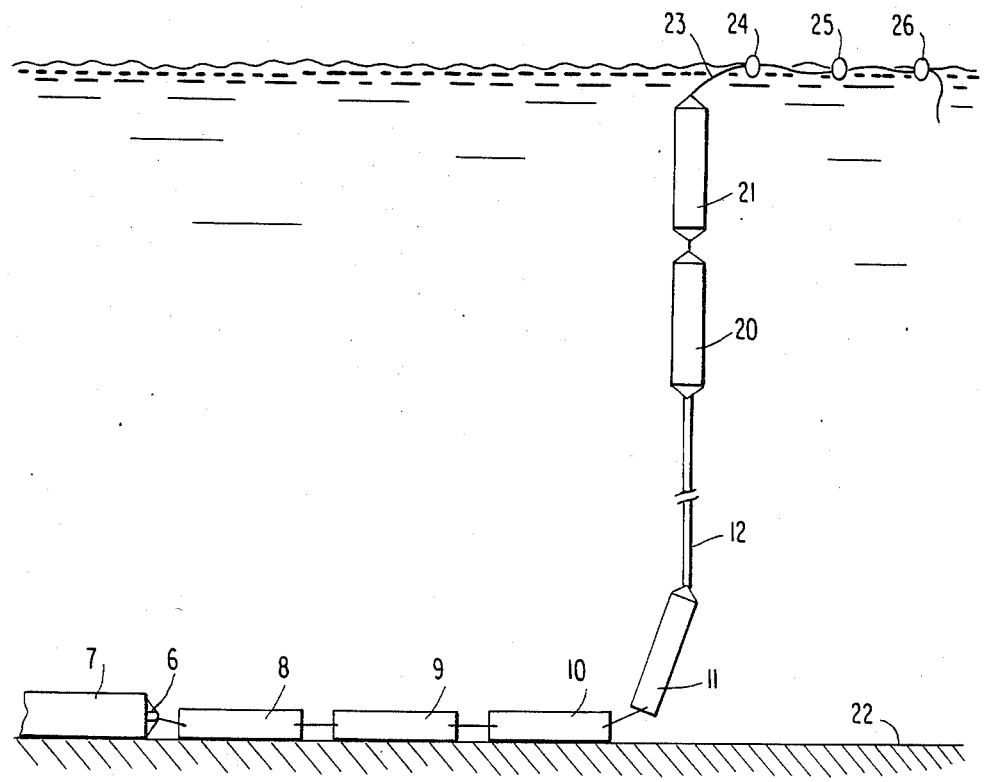
FIG. 3 shows the final position of the setting-down line, as it is situated during the waiting period until the adverse weather or other hindrance has ceased.

FIG. 3 shows the position which the setting-down line can adopt, after the setting-down operation, when the setting-down line is detached from the laying vessel.

The pipe 7 provided with the watertight traction head 6, and also the first three heavy elements 8, 9 and 10, rest on the sea bed, whereas the last heavy element 11 remains suspended from the cable 12. In this manner, the cable 12 benefits from a kind of anchoring, by virtue of the elements 8, 9 and 10, whilst the element 11 for its part, ensures the necessary ballast.

Two pencil buoys 20 and 21 are placed relatively close to the surface of the sea, preferably at a level, for example of −100 meters, which is sufficiently low for the said buoys not to be subjected to the action of the waves, and which is neverless not too deep for them to be reached by divers. They prevent the cable 12, made of synthetic material, from scraping the sea bed 22 and they make it possible to recover the setting-down line, even in the event of losing the surface line discussed below.

This surface line 23, which is of smaller gauge than the cable 12, is made fast to at least one of the pencil buoys 20 and 21 and it is intended to float on the surface over several hundred meters. It is fitted with floats, such as 24, 25 and 26, and with devices permitting its identification, in a manner analogous to the marking of the floating hoses of loading buoys.

In the event of losing this surface line 23 after a storm or damage, it will always be possible to recover the setting-down line after a team of divers have positioned a new surface line on the pencil buoys 20 and 21.

It is possible to have, for example, two or three pencil buoys each with a diameter of about 65 cm and a length of 21 meters in order to obtain a volume which can range from 13 to 20 $m^3$, with a specific gravity of between 0.4 and 0.5. These buoys have adequate dimensions for withstanding the thrusts of the underwater currents and for them not to be crushed.

These pencil buoys preferably have smaller transverse dimensions than the pipe sections, and they can be positioned with the aid of a loading arm and across a laying ramp, the arm and the ramp being provided on the laying vessel, in the same way as the sections of the pipe 7 and the heavy elements 8, 9, 10 and 11 are positioned.

It should be noted that the setting-down line, which is of greatest advantage for water depths of more than 1,000 meters and in particular in the case of so-called "J-laying", can equally well be used in shallow water, taking care to pay out the whole of the setting-down line, which will be spread over the bed so that it is not necessary to cut the cable of this line. This line will then have to be stabilised by means of sinkers placed at intervals up to a final portion which will rise towards the pencil buoys.

It is self-evident that the description of this particular example, and also the drawing which accompanies it, are given by way of illustrative and non-limiting example of the invention. It is also understood that the given example could form the subject of numerous modified embodiments without going outside the scope of the invention.

We claim:

1. A process for the setting-down of a pipe in the sea by means of a setting-down line, the pipe having a free end to which is fixed a water-tight traction head, said line being joined at its lower end to the water-tight traction head and at its upper end to a tensioning device carried by a vessel at the sea's surface so that an upper portion of the line is straight and forms an angle of general inclination with the vertical during the lowering of the pipe, said process being characterized by the improvement comprising: providing the line with a lower portion shorter than the upper portion; and tensioning the setting-down line by placing sinkers at only said lower portion of the setting-down line, thereby reducing the angle of general inclination which the straight upper portion of the setting-down line forms with the vertical during the lowering of the pipe and, thus, reducing the length of the line.

2. A process according to claim 1, wherein the reduced angle of general inclination corresponds to a length of setting-down line of less than 1.5 times the depth of the sea.

3. A process according to claim 1, or claim 2, comprising keeping said angle of general inclination substantially constant during the setting-down operation.

4. A process according to claim 3, wherein said substantially constant angle of general inclination corresponds to a length of setting-down line of about 1.25 times the depth of the sea.

* * * * *